(12) United States Patent
Bhagavatula

(10) Patent No.: US 6,571,034 B2
(45) Date of Patent: May 27, 2003

(54) SPECTRALLY-SHAPED OPTICAL COMPONENTS USING A WAVELENGTH-DISPERSIVE ELEMENT AND A REFLECTIVE ARRAY

(75) Inventor: Venkata A. Bhagavatula, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/894,586

(22) Filed: Jun. 28, 2001

(65) Prior Publication Data

US 2003/0002788 A1 Jan. 2, 2003

(51) Int. Cl.[7] .................................................. G02B 6/26
(52) U.S. Cl. .............................. 385/27; 385/11; 385/37
(58) Field of Search .............................. 385/27, 11, 37, 385/24, 140

(56) References Cited

U.S. PATENT DOCUMENTS

| | | | |
|---|---|---|---|
| 4,741,588 A | * 5/1988 | Nicia et al. | 385/11 |
| 4,746,186 A | * 5/1988 | Nicia | 359/124 |
| 5,412,744 A | 5/1995 | Dragone | 385/24 |
| 5,450,511 A | 9/1995 | Dragone | 385/37 |
| 5,521,753 A | 5/1996 | Fake et al. | 359/341.32 |
| 5,881,199 A | 3/1999 | Li | 385/140 |
| 6,137,933 A | * 10/2000 | Hunter et al. | 385/24 |
| 6,141,152 A | * 10/2000 | Trouchet | 359/634 |

* cited by examiner

Primary Examiner—Ellen E. Kim
(74) Attorney, Agent, or Firm—Walter M. Douglas

(57) ABSTRACT

The present invention features an optical component based on a wavelength-dispersive element in conjunction with reflective elements to provide wavelength-sensitive control multi-wavelength light signals such as wavelength division multiplexed (WDM) light signals. Both static reflective elements and movable (dynamic) reflective elements are described. Optical devices such as gain-flattening filters and dynamically configurable wavelength selective routers with built-in gain flattening filters are described.

19 Claims, 12 Drawing Sheets

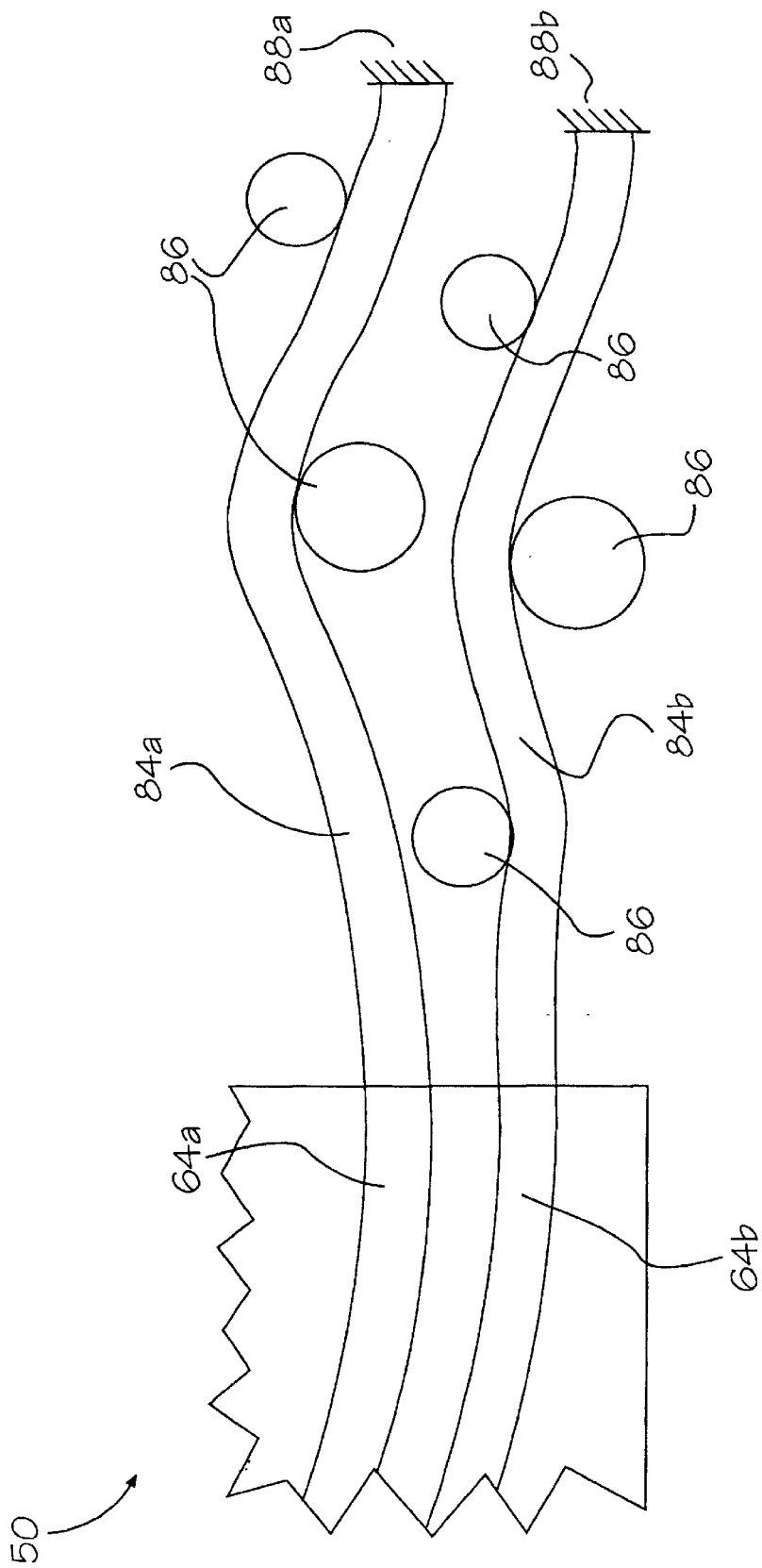

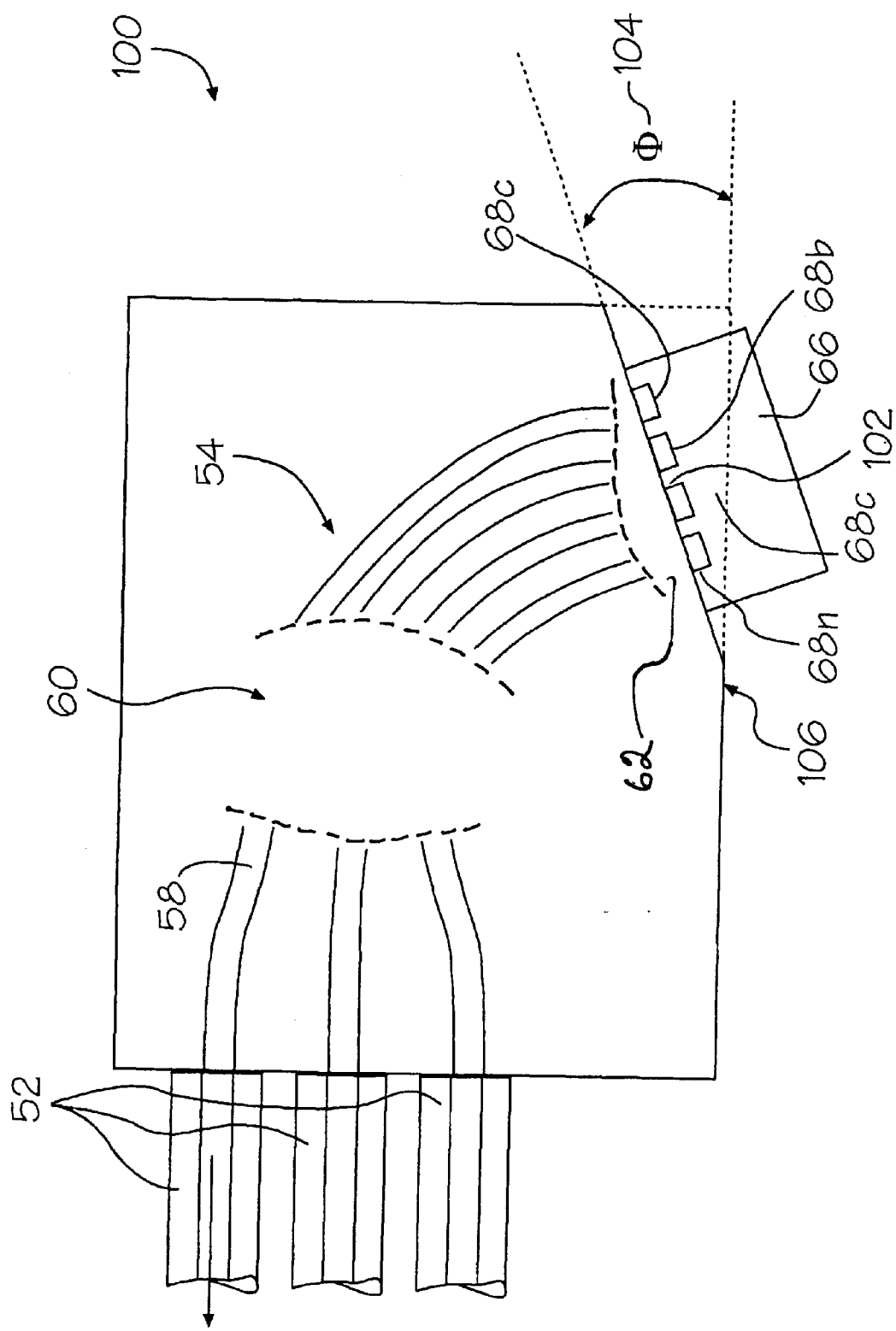

SPECTRALLY-SHAPED OPTICAL COMPONENTS USING A WAVELENGTH-DISPERSIVE ELEMENT AND A REFLECTIVE ARRAY

BACKGROUND OF THE INVENTION

1. Field of the Invention

The present invention relates to wavelength sensitive optical components and, more specifically, to optical components utilizing a wavelength-dispersive element in combination with a static or dynamic reflective element to construct optical components such a gain flattening filters or reconfigurable, wavelength-selective routers with built-in gain flattening.

2. Background of the Invention

Communication in the form of data networks and the like increasingly relies upon optical fiber as the transmission medium of choice. Originally, fiber optic network connections were point-to-point replacements for copper wires on long links. Optical-electrical conversions were required only at each end of the optical fibers. Currently, however, all-optical network architectures are used in which optical signals are routed among different fibers of the network without needing intermediate conversions of optical signals to electrical signals and vice versa.

One popular architecture utilizes wavelength division multiplexing (WDM) in which multiple optical carriers carry data signals directed to different destinations. These carriers are impressed upon a single optical fiber. In such WDM systems, in order to avoid intermediate conversions, optical routers must be employed. In a typical, simple optical router, two input fibers carry respective sets of wavelength channels $\lambda_1, \lambda_2, \lambda_3, \ldots \lambda_n$ and $\lambda_1', \lambda_2', \lambda_3', \ldots, \lambda_n'$, respectively. The router is capable of selectively directing these different wavelength channels to different output fibers. A typical router, for instance, may direct wavelength channel $\lambda_1$ to one output fiber and wavelength channel $\lambda_1'$ to another.

These routers, or similar optical components, rely on a frequency-dispersive element to accomplish their function; receiving light from one or more input waveguides (i.e., optical fibers) and dispersing it, according to frequency, to one or more output waveguides. The frequency-dispersive element typically is a dielectric filter, Bragg grating, interferometer, or free-space grating, each of these devices being well known to those skilled in the art.

All of these frequency-dispersive elements, however, have limitations. For example, dielectric filters typically exhibit stability problems and are therefore unsuitable for use in narrow-band WDM applications. Devices such as Bragg gratings and interferometers may require cascading in order to achieve high channel counts in WDM applications. In addition, Bragg gratings suffer from mechanical stability and high back reflection problems.

The frequency-dispersive element presents potential difficulties in a WDM network, particularly one in which signals may originate from many different transmitters and may travel through many routers. Each of the transmitting lasers operating at a channel wavelength $\lambda_1$ (and there may be several of them originating at geographically distant points) must transmit within a given fraction of the allotted bandwidth, $\delta\lambda$. Lasers, however, tend to drift for a number of reasons, including variation in ambient temperature and aging.

The design bandwidth $\delta\lambda$ cannot be increased without increasing the wavelength spacing $\Delta\lambda_{SP}$, hence decreasing the total number of channels (i.e., the total fiber throughput). This is because system considerations, such as amplifier bandwidths, generally limit the total wavelength span covered by all channels. Consequently, even small drifts in frequency of the laser emissions from the peak of a filter's transmission curve may cause difficulties. These frequency drifts mean that a laser signal at a filter's transmission peak may exit the router with larger amplitude than does another signal, shifted slightly down the side of the filter transmission curve. Unfortunately, these amplitude differences may be multiplied many times as the signals pass through many routers. In addition, the amplitude differences depend not only upon which laser originated the light but also upon the particular routers the signal has passed through, since filter transmission characteristics can vary from one router to another. These transmissivity differences arise from several factors such as variation of ambient temperature, aging, and differences in fabrication, which make correction difficult when the network interconnects and/or topologies change frequently.

Because of this problem, it is desirable to ensure that the frequency-dispersive element has flat band-pass transmission spectra. A flat pass-band allows laser frequencies to drift within the width of the flattened band-pass region without creating amplitude differences as described hereinabove.

A class of frequency-dispersive elements recently considered for constructing routers and similar optical devices are phased array (or "phasar") devices. Their advantages are that they may be fabricated using conventional, well-known integrated optical circuit fabrication techniques and they support high channel counts.

One gain flattening technique using a phasar is to couple the output of single-mode waveguides into an optical interaction region containing a wavelength-dispersive element which collects light from one or more input waveguides. Light is dispersed, in accordance with its wavelength, to one or more output waveguides.

A multi-mode waveguide of a predetermined length is interposed between the optical input waveguides and the optical interaction region. This multi-mode waveguide creates a multiple-peaked image at its output in response to a single-peaked profile presented at its input end. In essence, the apparatus creates a multi-mode interference (MMI) filter having a flattened pass-band less sensitive to frequency drift of the source laser. The frequency-dispersive element is an arrayed waveguide grating disposed between a pair of optical interaction regions.

In contradistinction, the optical component of the present invention utilizes reflective arrays placed at the output side of a phasar to selectively reflect light at predetermined wavelengths. All wavelength components in a single group leave the device at essentially the same amplitude. By moving the reflective elements in relation to the phasar, the gain-flattening component may be made tunable for use in dynamic as well as static applications.

Gain flattening devices and, more particularly, gain flattening filters (GFFs) are an important class of devices that flatten the gain of fiber amplifiers. When such amplifiers are cascaded, performance, especially bandwidth, is not degraded. This is especially important in dense wavelength division multiplexing (WDM) applications where adequate and predictable gain across a relatively wide bandwidth is necessary.

Gain flattening filters have been developed using a variety of techniques for application in various wavelength ranges such as red band, blue band, etc. Technologies such as mechanical, acoustic and planar lightwave circuits, all well known to those skilled in the art, have heretofore been employed for implementing GFF devices. These prior art devices suffer from one or more limitations. Among other things, they are generally bulky and/or expensive. Also, because several optical components must sometimes be cascaded, the resulting GFFs are more subject to failure than is the simpler device of the present invention. Art relating to the claimed invention may be found in U.S. Pat. Nos. 5,412,744 to Dragone titled "Frequency Routing Device Having A Wide And Substantially Flat Passband"; 5,450,511 to Dragone titled "Efficient Reflective Multiplexer Arrangement"; 5,521,753 to Fake et al. Titled "Multi-Stage Fibre Amplifier"; and 5,881,199 to Yunn titled "Optical Branching Device Integrated With Tunable Attenuators For System Gain/Loss Equalization."

SUMMARY OF THE INVENTION

In accordance with the present invention, there are provided planar phasar devices to implement both static and dynamic gain-flattening filters and other wavelength-selective optical components, such as dynamically reconfigurable routers and the like for use in wavelength division multiplexed applications.

The present invention provides several innovative designs that overcome problems associated with traditional GFF devices. The designs, based on wavelength-dispersing elements, provide gain flattening over a wide range of wavelengths. These devices can provide better gain flattening in more compact packages. In addition, techniques for making such devices tunable for dynamic gain flattening and wavelength routing are also disclosed, as is the formation and utilization of the virtual image disclosed herein.

In one embodiment, the present invention provides a wavelength-sensitive optical component, which combines a wavelength-dispersive element with a reflector array for implementing wavelength-selective routers and other optical components. The reflector array may be dynamic and controllable. The wavelength-dispersive element may be a phasar.

In another embodiment, the wavelength-sensitive optical component may be a gain-flattening filter (GFF) having low insertion losses and good bandwidth control so that bandwidth degradation is minimized as GFFs are cascaded. The GFF is constructed from a minimum number of optical components to help ensure reliability.

In another embodiment the optical component may be a hybrid optical component for selectively routing and/or changing the characteristics of a plurality of discrete wavelengths in a multiplexed light signal. Among other thing, the hybrid optical may contain an optical component selected from the group consisting of phasar devices, planar grating devices, and bulk optical wavelength-dispersive devices; a frequency-dispersive element for separating the plurality of discrete wavelength channels from one another; an assembly of reflective elements optically connected to the frequency-dispersive element for selectively and independently reflecting selected ones of the plurality of discrete wavelength channels in response to a control; and a multiplexer for combining the selected ones of the plurality of discrete wavelength channels into at least one output signal.

BRIEF DESCRIPTION OF THE DRAWINGS

A complete understanding of the present invention may be obtained by reference to the accompanying schematic, not-to-scale drawings, when taken in conjunction with the detailed description contained herein.

FIG. 5d is a schematic view of the output portion of an optical phasar showing the reflective elements optically attached to the phasar using bent waveguides to selectively control reflectivity, in accordance with the present invention.

FIG. 6 is a schematic view of a modified optical phasar having a reflective array attached to a cut and polished end of the optical phasar, in accordance with the present invention;

DESCRIPTION OF THE PREFERRED EMBODIMENT

Generally speaking, the present invention features an optical phasar which, in conjunction with an array of reflective elements at its optical output end, may be used to create a frequency-selective optical component. Such components are particularly useful for implementing gain-flattening filters, routers, or other similar optical components. The present invention features a movable reflector array, which allows the construction of tunable optical devices for applications requiring dynamic wavelength-selective devices.

Figure 1:
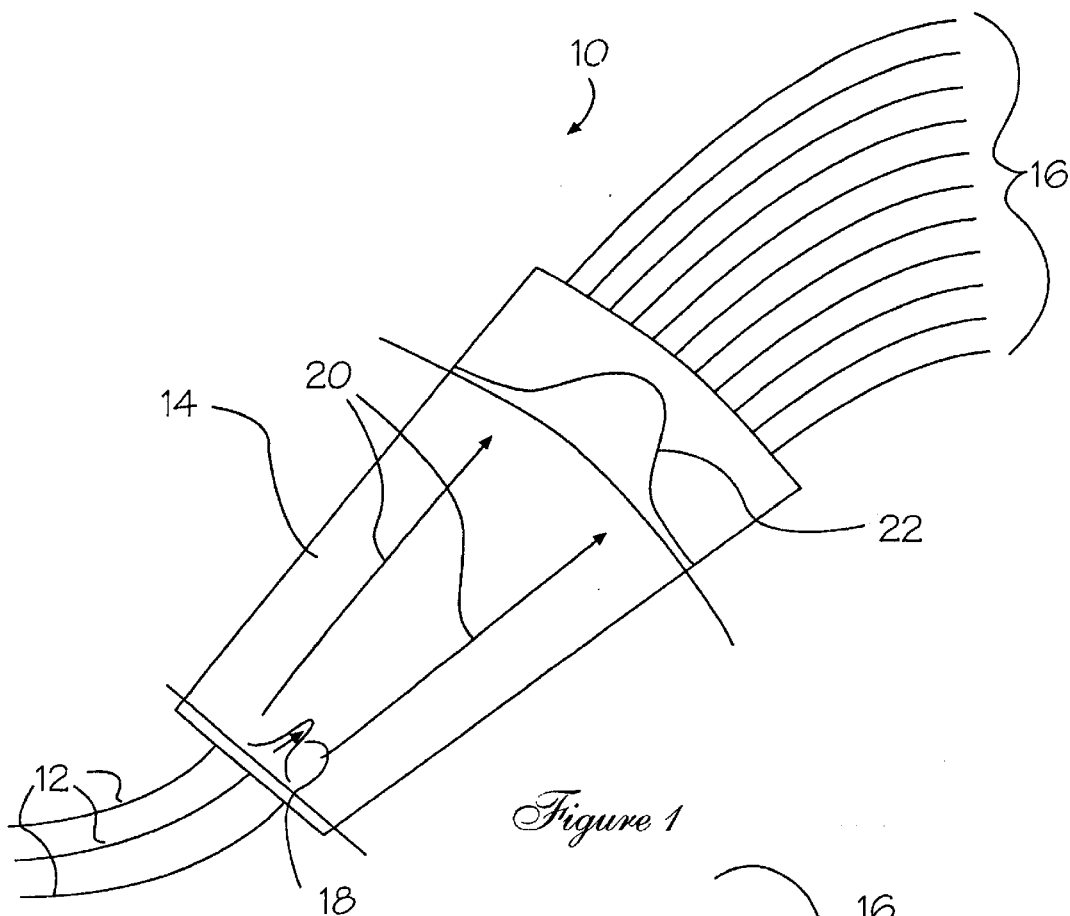
FIG. 1 is a schematic view of the input portion of an optical phasar device.

Referring first to FIG. 1, there is shown a schematic view of a typical optical phasar device, generally at reference number 10. The construction and use of phasar devices is well known to those skilled in the fiber optic arts. A series of single-mode optical fibers 12 is shown terminated at the input to phasar 10. Input slab 14 distributes power (signals) from input fibers 12 to an array of waveguides 16. For purposes of simplicity, only a single signal 18 is shown. Input signal 18, applied from one of the fibers 12, typically has E-field wave shapes and power distributions which are approximately Gaussian. As this signal 18 propagates through slab 14 in direction 20, this Gaussian distribution is maintained while input signal 18 is diffracted into a diffracted signal 22.

Figure 2:
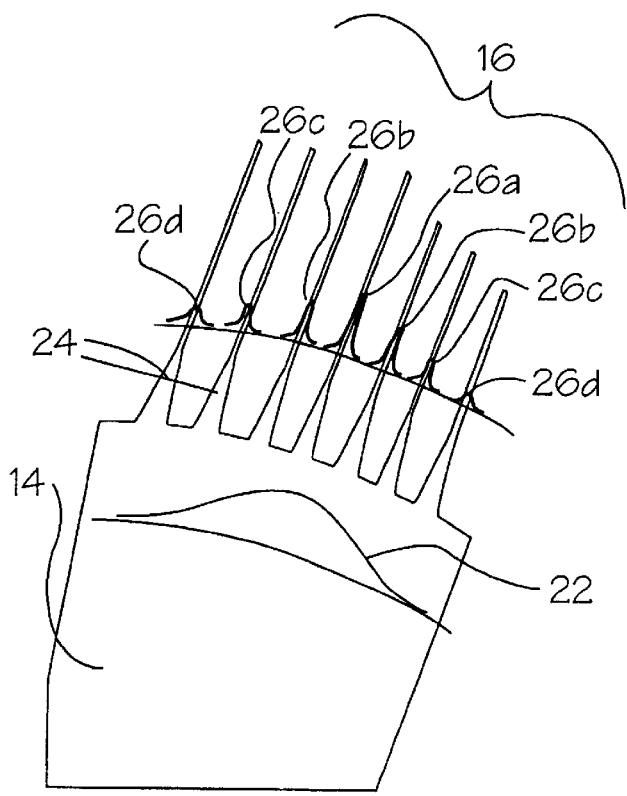
FIG. 2 is a schematic view of the phased array connected to the input slab of an optical phasar.

Referring now also to FIG. 2, there is shown a detailed, schematic view of the connection of input slab 14 to waveguide array 16. Funnel structures 24 may be utilized to channel diffracted signal 22 into the individual waveguides of waveguide array 16. Coupled E-field signals 26a, 26b, 26c, 26d have amplitudes commensurate with the physical position of the individual waveguide within waveguide array 16. The signal amplitudes are related to the Gaussian distribution of the E-field of signal 22. Coupled signal 26a has significantly higher amplitude than coupled signal 26d.

Figure 3:
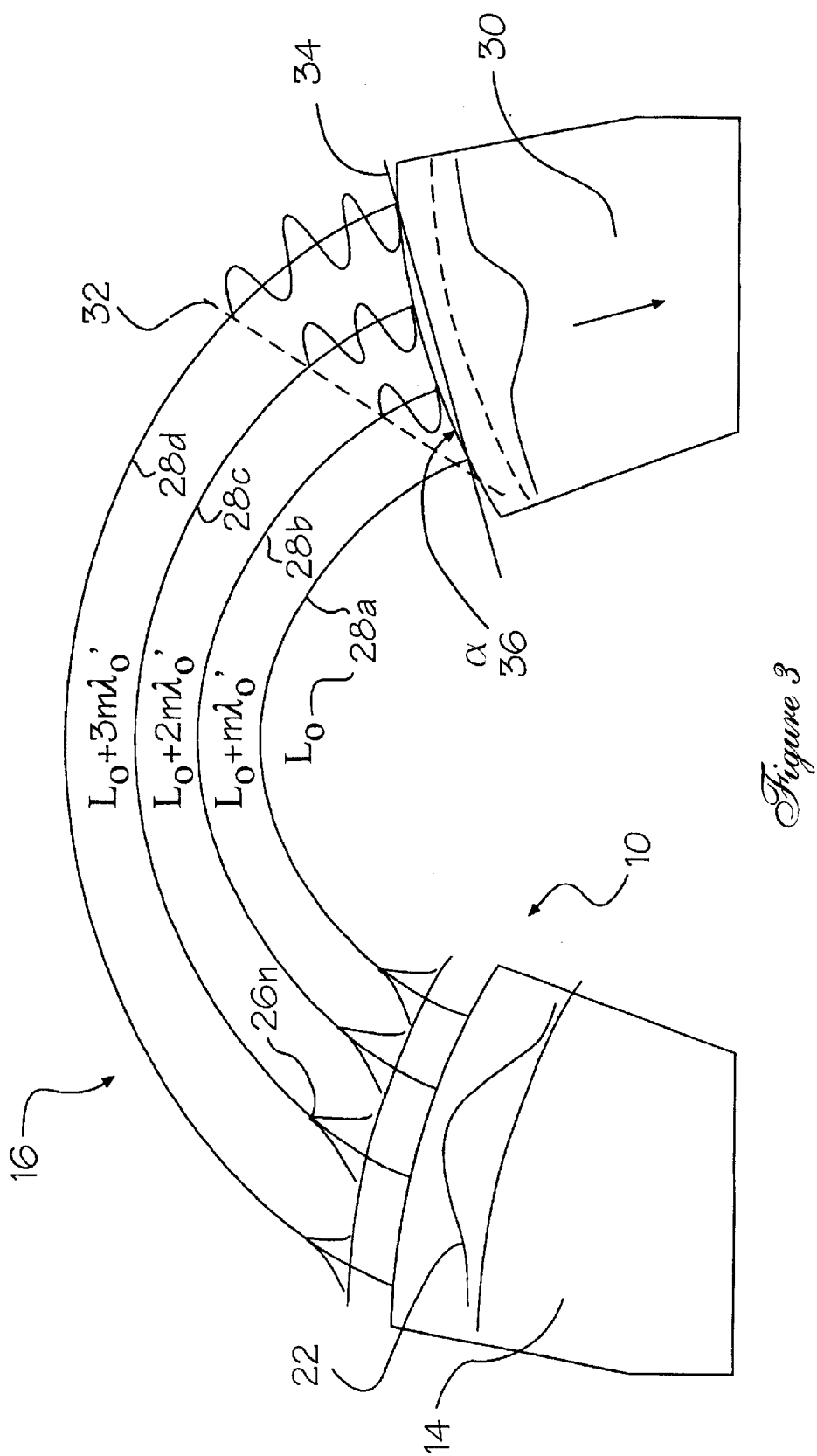
FIG. 3 is schematic view of the coupling waveguide phased array of a typical optical phasar.

Referring now also to FIG. 3, waveguide array 16 consists of individual waveguides 28a, 28b, . . . 28n, the number of fibers in the array depending upon the width of input slab 14. The optical path difference between individual waveguides 28a, 28b . . . etc. is chosen to be an integral multiple of the central wavelength of phasar device 10. In addition, the optical path lengths of individual waveguides 28a, . . . 28n are generally different and are also chosen to be integral multiples of the wavelength applied to phasar 10 (i.e., $L_2 = L_1 + m \lambda_1$ where m is an integer). In other words, the length of fiber 28b is the sum of the length of waveguide 28a and an integral multiple of some central wavelength $\lambda_0$.

As signals of varying wavelengths travel through the individual waveguides of array 16 to an output end, a constant phase line 32 may be drawn at an angle $\alpha$ (36) relative the output plane 34 of the array of waveguides 16. In other words, at an arbitrary point along the path of waveguide array 16, the E-field signal propagating along each of the waveguides in array 16 is in phase for a given wavelength $\lambda_0$. The phasar device 10 of the prior art, as described hereinabove, can serve as a multiplexer/demultiplexer as configured. Signals at discreet wavelengths $\lambda_1, \lambda_2, \lambda_3, \ldots \lambda_n$ are "sorted" into individual output channels (wavelength channels) by the phasar. This phenomenon may be used to advantage to create unique gain-flattening filters and other wavelength-dependent optical components.

Figure 4:
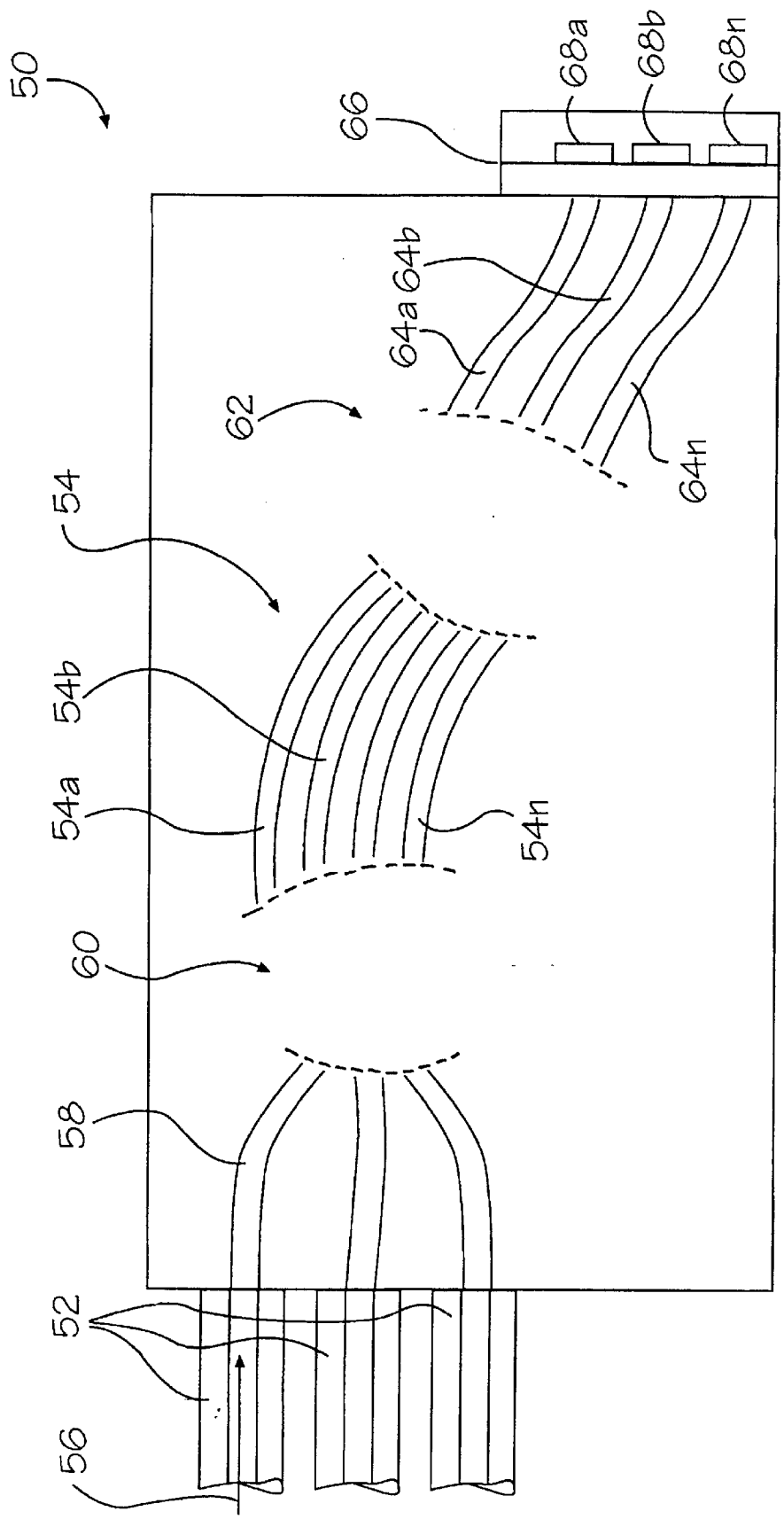
FIG. 4 is a schematic view of a typical optical phasar having a reflective array attached end-on at its output side, in accordance with the present invention.

Referring now to FIG. 4, there is shown a schematic view of a phasar device 50. A plurality of input/output waveguides/fibers 52 enters the input end of phasar 50. It should be noted that phasar 50 may be asymmetrical; in such cases the designation of "input end" is purely arbitrary. In the optical device, waveguides 52 may selectively perform either input or output functions. A phased array of waveguides 54 is adapted to receive a multiplexed signal 56 composed of several discreet wavelengths $\lambda_1, \lambda_2, \lambda_3, \ldots \lambda_n$. The various wavelengths comprising the input signal 56 may have different origins within a network and be at significantly different signal strengths (power levels) as they arrive at the phasar 50 via one of the fibers 52. The signal 56 is conducted into phasar 50 by input waveguide 58 which are optically coupled to a region 60, a planar lens which defracts light such that each wavelength thereof falls onto each waveguide 54. Signals passing through lens 60 then traverse waveguide array 54 and are directed toward region 62, which acts as a wavelength-dispersing lens. The process of de-multiplexing input signal 56 continues, wavelength component $\lambda_1$ essentially all being directed into output waveguide 64a, $\lambda_2$ into output waveguide 64b, etc.

A reflector assembly 66 consisting of an array of individual reflective elements 68a, 68b, . . . 68n, each optically associated with output waveguides 64a, 64b, . . . 64n, respectively, is shown attached to the output of phasar 50. Reflective array 66 may be attached end-on to the output of phasar 50 as shown or, in alternate embodiments, attached to the top of phasar 50 by means of a 45-degree bevel. In still other embodiments, reflective array 66 may be attached to a fiber array or pigtail (not shown) attached to the output of phasar 50. The additional expense and insertion loss of the pigtail, however, makes this a less desirable solution than direct, end-on or top attachment.

Figure 5A:
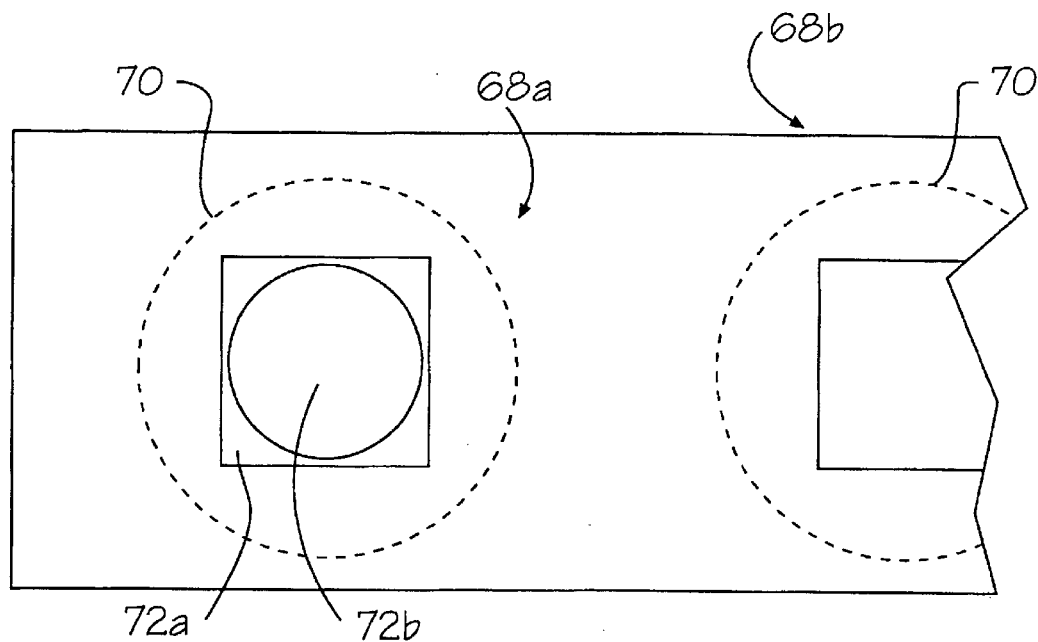
FIG. 5a is an enlarged, schematic view of a portion of a reflective array, in accordance with the present invention.
Figure 5B:
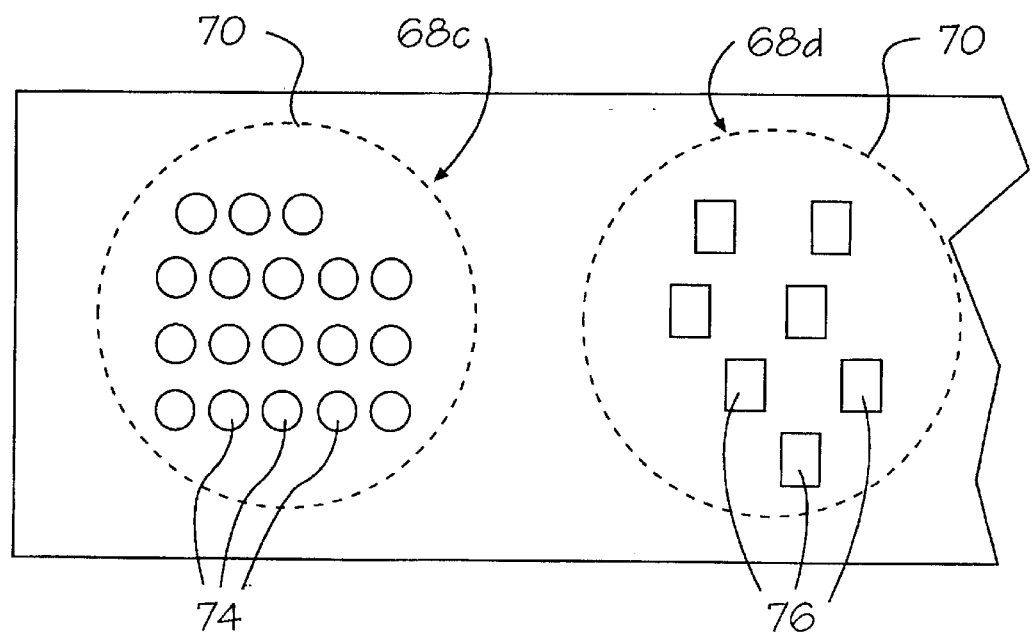
FIG. 5b is an enlarged, schematic view of a portion of a reflective array showing an alternate method for selectively controlling reflectivity, in accordance with the present invention.

Referring now also to FIGS. 5a and 5b, there are shown schematic views of portions of typical reflective elements 68a, 68b. Areas 70 represent the "effective" areas of typical signals' power distributions. In the center of regions 70 are located metallic/dielectric reflective surfaces which may be square 72a, circular 72b, or any other geometric shape (not shown) suitable for a particular application. The reflective characteristics and areas of reflective coatings 72a, 72b are chosen such that the amount of reflected light at any particular wavelength is just sufficient to flatten the gain of the amplifier at that wavelength.

There are several ways to control the reflectivity of the individual reflective elements 68a, 68b. One way of controlling the reflectivity is to coat the desired area with a material having a controlled or predetermined reflectivity. The area of each reflective element remains essentially constant but the reflectivity of the deposited material may vary from element to element. The size of the reflective elements is generally smaller than that of the area 70 occupied by the signal field in the output waveguide 64a, 64b, . . . 64n.

A second method of selectively controlling the reflected light from the reflective elements 68a, 68b is to deposit a "half tone" pattern. The size and density of reflective dots or lines control the reflective to non-reflective ratio of the area. FIG. 5b shows two of many possible patterns for such a deposition. Circular reflective dots 74 are shown on a first reflective element 68c while rectangular reflective areas are shown on a second reflective element 68d.

Figure 5C:
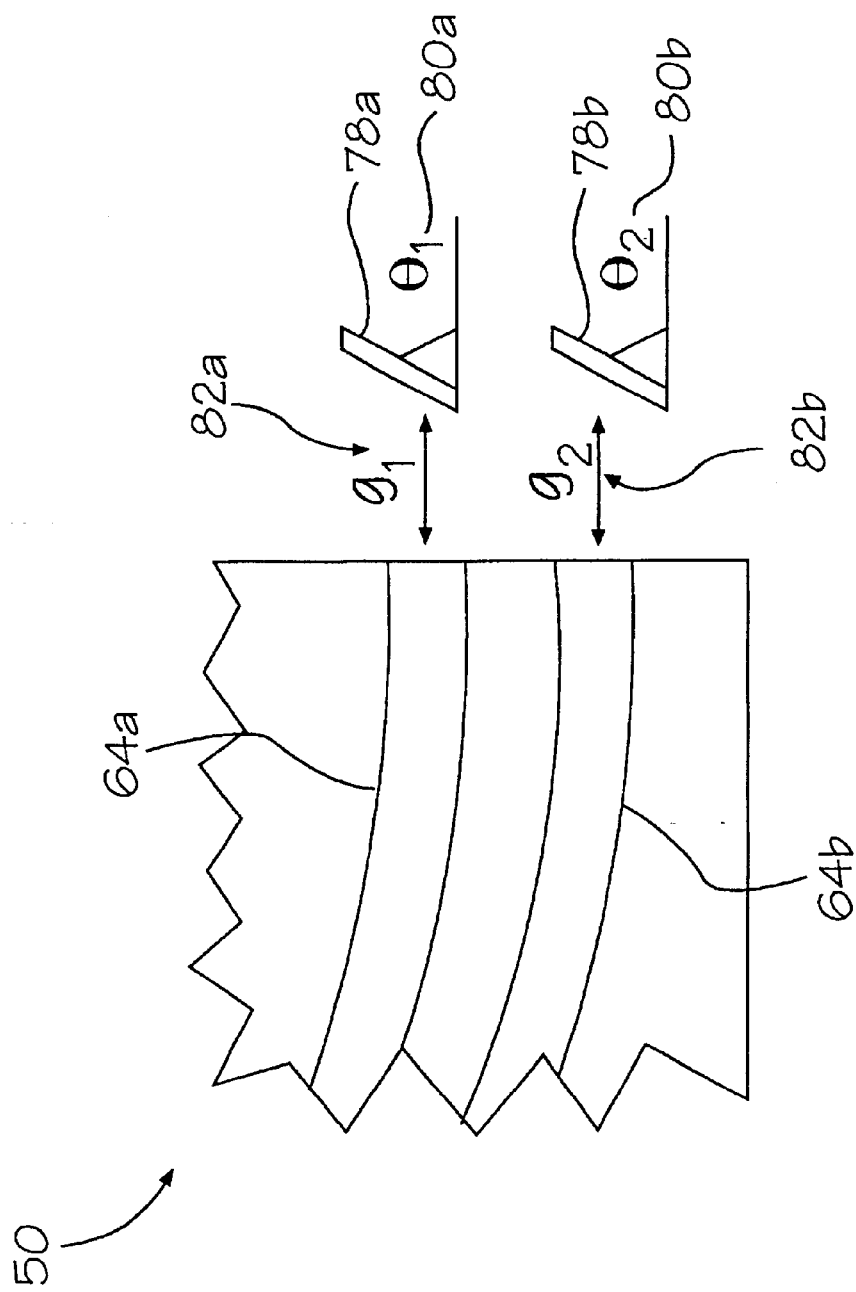
FIG. 5c is a schematic view of the output portion of an optical phasar showing reflective elements displaced from the output end of the phasar, in accordance with the present invention.

Referring now to FIG. 5c, there is shown a schematic view of a third way to selectively control overall reflectivity. Films 78a, 78b that are substantially totally reflective are placed at distances $g_1$ (82a) and $g_2$ (82b) from the end of phasar output waveguides 64a and 64b, respectively. Each reflective film 78a, 78b may be set at a particular angle $\theta_1$ (80a) and $\theta_2$ (80b) relative to the ends of output waveguides 64a, 64b. By varying the individual distances 82a, 82b and/or angles 80a, 80b, the coupling efficiency from the reflected light back into the waveguide is smaller by the amount required to achieve the desired attenuation at a particular wavelength.

Referring next to FIG. 5d, there is shown a fifth method for providing controlled reflectivity. A pigtail comprising individual waveguides 84a, 84b is optically coupled to the output waveguides 64a, 64b, respectively, of phasar 50. Waveguides 84a, 84b are selectively bent by suitable bend-inducing elements 86, thereby selectively introducing controlled losses in each waveguide 84a, 84b. Essentially 100% reflective elements 88a, 88b are placed at the ends of waveguides 84a, 84b, respectively. The amount of light reflected into phasar 50 is thereby controlled by the losses in the individual waveguides. The disadvantage with this approach is that the reflected light is directed to the input fiber itself. A circulator (not shown) may be needed to separate the gain flattened signal. The circulator adds both to the system loss and to the cost.

Figure 5E:
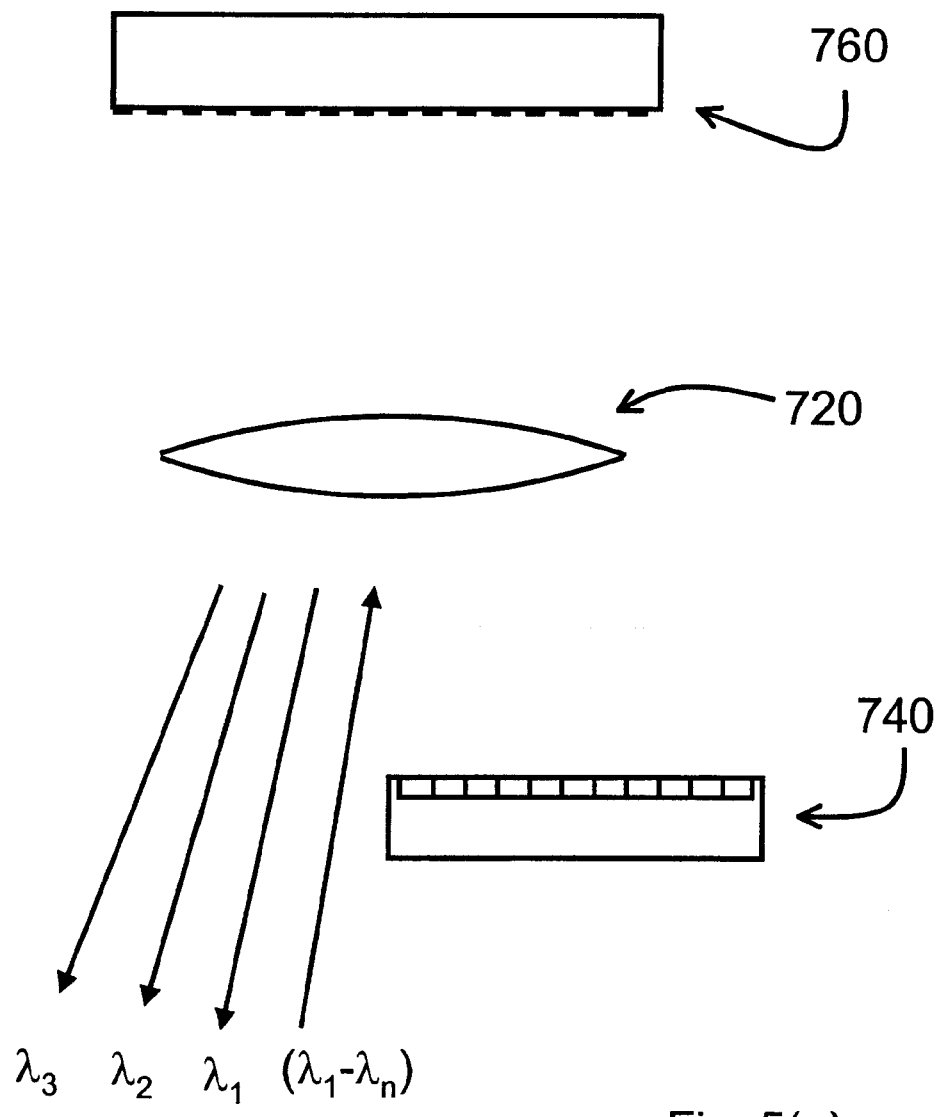
FIG. 5e is a schematic view of a hybrid device combining a micro-optic grating to separate incoming $\lambda_1$-$\lambda_n$ wavelengths with a reflector assembly to redirect the $\lambda_1$-$\lambda_n$ wavelengths after processing.
Figure 5F:
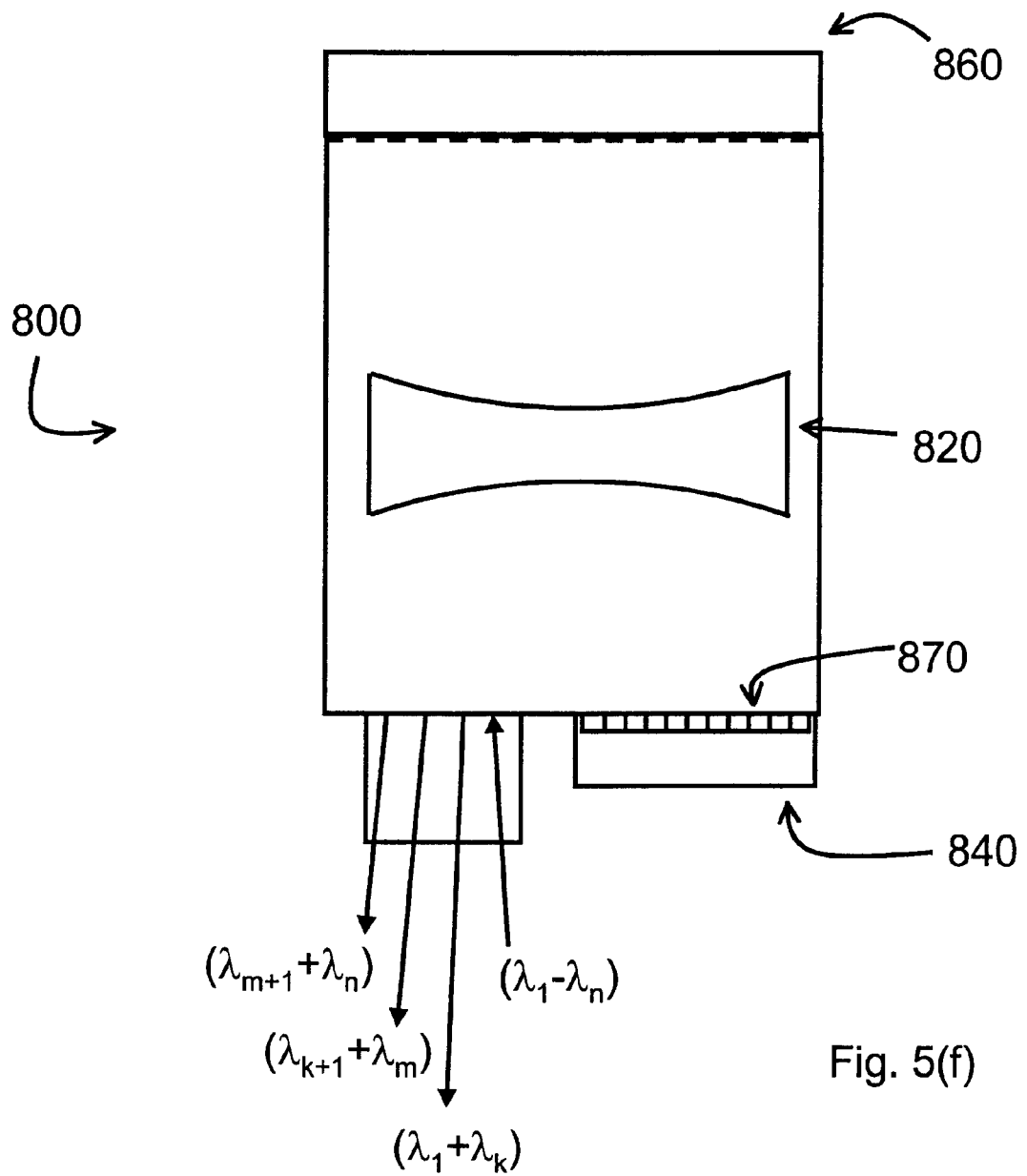
FIG. 5f is a schematic view of a hybrid device combining, among other elements, a grating, a planar chip having a planar lens therein, and a reflector assembly.

These concepts may be applied to other wavelength dispersing designs based on planar, bulk or hybrid gratings or multi-path interference devices or the like, as are well known to those skilled in the art. FIGS. 5e and 5f represent hybrid grating devices that can be formed using the teachings of the present invention. Such devices can be used with or without spectral flattening.

In FIG. 5e, a conventional micro-optic grating 760 is used to separate light of wavelengths $\lambda_1$-$\lambda_n$. Entering light $\lambda_1$-$\lambda_n$ passes through lens 720 to grating 760 where said light is separated by wavelength and reflected back through lens 720. Lens 720 again disperses said light, and light of each separated wavelength thereafter impinges upon reflector assembly or array 740. The reflector elements of reflector assembly 740 can have thereon, or in proximity thereto, coating, films, filters and other elements known in the art to be useful for changing intensity, phase, polarization or other properties. Subsequent to reflection by assembly 740, the reflected light, each wavelength of which has a shifted focal point relative to the incoming wavelength, again passes through the device. Having been shifted, each wavelength, $\lambda_1$, $\lambda_2$. . . $\lambda_n$ may then enter a separate waveguide. Alternatively, there may be bands of wavelengths, each band of which may enter a separate waveguide. FIG. 5f illustrates a hybrid planar device 800 having, among other elements, a grating, a planar chip having a planar lens therein, and a reflector assembly or array. Light having wavelengths $\lambda_1$-$\lambda_n$ enters device 800 by means known in the art, for example as illustrated in FIG. 4. Planar lens 820 disperses the incoming light and the dispersed light impinges upon grating 860 whereupon it is separated by wavelength and reflected. The grating separated-and-reflected wavelengths then impinge upon lens 820, and a portion of the again dispersed light falls upon reflector assembly 840. After reflection by the reflector assembly 840, the reflected light, which has its path shifted, again passes through the device to emerge through one or a plurality of waveguides as an output signal. As with the device of FIG. 5e, additional elements can be included to change the intensity, phase, polarization and other properties of the output light signal. For example, reflector(s) in reflector assembly 840 can have a coating thereon to reduce the intensity of selected portions of the output signal to thereby flatten the signal so that all emerging signals are of substantially equal intensity. Additionally, one may optionally add a polarizing element, for example, between the planar chip and the reflector assembly, or the grating may have a polarizing substance thereon or between the grating and the planar chip.

Another approach to the problem of constructing a gain-flattening filter is to use an optical phasar device having a different internal construction. The technique relies upon utilizing a modified optical phasar device, still in a reflective mode. Referring now to FIG. 6, there is shown a schematic view of a modified phasar 100, similar to phasar device 50 (FIG. 4), having input fibers 52, waveguides 58, lens region 60, waveguide array 54, and wavelength dispersing lens 62. In FIG. 6, no waveguides are present at the output of the wavelength dispersing lens 62 as are present in FIG. 4. Instead, the output end 102 of phasar 100 is cut and polished at an angle Φ (104) relative to the uncut end 106 of phasar 100 such that polished end 102 is essentially at the focus area of the output freespace (wavelength dispersing) lens 62.

A reflector assembly 66 is attached end-on to polished end 102. Reflector assembly 66 has individual reflective elements 68a, 68b . . . 68n, each optically aligned with the focal point of lens 62 at a particular wavelength. The angle and the location of reflective elements 68a, 68b, . . . 68n are chosen such that the virtual images of the reflected light are shifted sideways with respect to the original positions at which the various wavelength signals would have otherwise focused. This shift is determined in such a way that the reflected light for all wavelengths is directed to another waveguide adjacent to the input waveguide. Beam propagation techniques or other techniques may determine these virtual reflective locations, simply by using the output waveguide as the new input waveguide.

Figure 9:
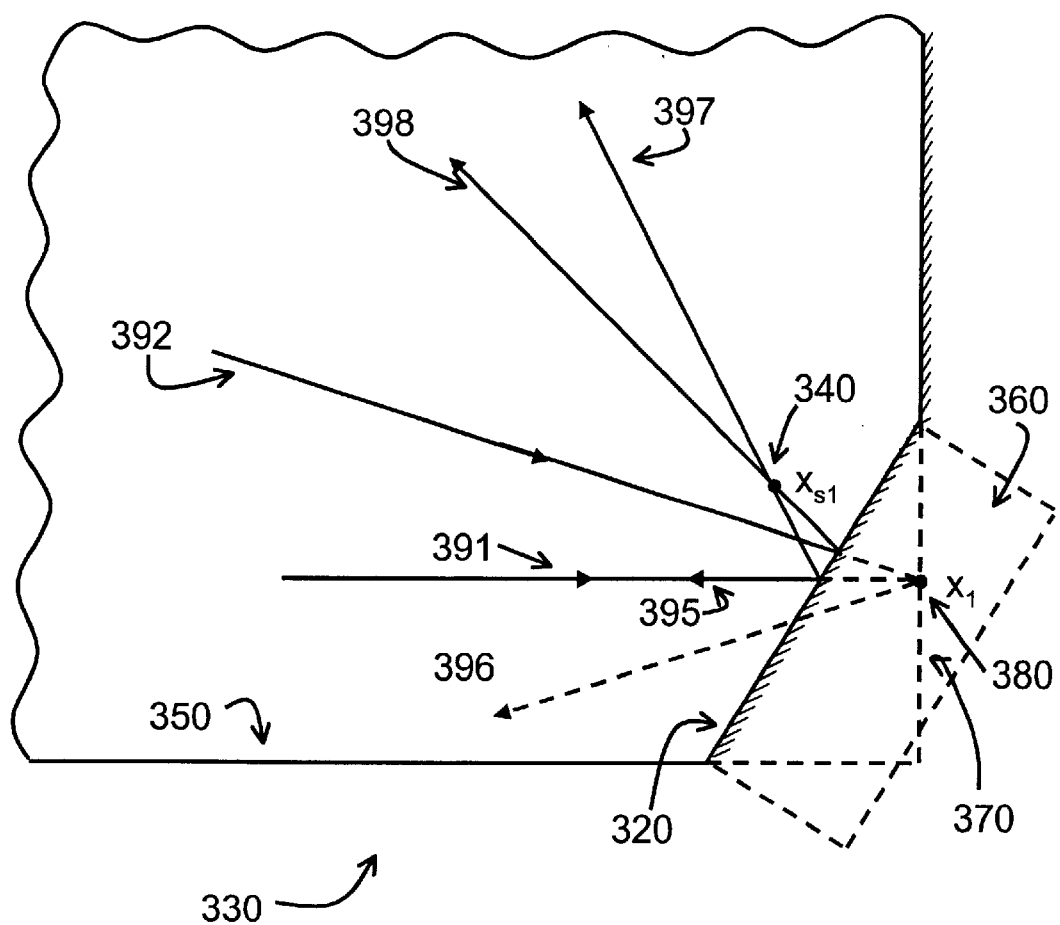
FIG. 9 is an illustration, using a single phasar channel, of how "virtual" images are formed when a channel face is slanted.

To obtain the output on the same waveguide for all wavelengths, the reflective surfaces 68a, 68b, . . . 68n may be constructed with shapes more complicated than the single-angled facet reflective elements 68a, 68b, . . . 68n as described above. FIG. 9 is an illustration, using a single phasar channel, of how "virtual" images are formed when the channel face is slanted or sloped. FIG. 9 shows a phasar channel 350 ending in either a "flat" face or surface as illustrated by dashed line 370, or a slanted face or surface as illustrated by solid line 320. In either case a reflector assembly (illustrated as attached to 320 only) can be attached to or located at a selected distance from face 320 or 370. In the case where the reflector assemble is attached to face 370 (the non-slanted face), incoming light rays 391 and 391 (hereby designated $\lambda_1$ and $\lambda_2$, respectively) will converge and focus at point $x_1$, a focal point 380 on face 370. When a reflector assembly is attached to face 370, ray 391 will be reflected back as indicated by 395 and ray 392 will be reflected as indicated by 396. Upon travel back through the phasar device the reflected rays 395 and 396 are returned as output signals to the same optical fiber from which they were initially inputted into the device.

In contrast to the above model, when a phasar device has a slanted face 320 as illustrated with a reflector assembly 360 attached thereto, incoming rays 391 and 392 are intercepted and reflected as rays 307 and 308, respectively, before they can reach focal point $x_1$ at 380. The reflected rays 397 and 398 will converge at a new focal point $x_{s1}$ at 340 to form a virtual image. Subsequently, the reflected rays 397 and 398 will travel through the phasar device and exit through a waveguide to an optical fiber for further transmission or other use. However, because the focal point has been shifted from 380 ($x_1$) to 340 ($x_{s1}$), rays 397 and 398 will be directed as an output to a waveguide and optical fiber different from the waveguide and optical fiber that served to input the original signal.

The output areas where different wavelengths are reflected may be coated with reflected materials to provide the appropriate loss as a function of wavelength. The reflection tailoring can be done again on a channel-by-channel basis, or in wavelength bands, or at higher resolution compared to the channel spacing as described hereinabove. The reflection tailoring can be determined based on specific device design requirements such as the linear dispersion of the phasar and the resolution of the reflective elements. Any combination of the techniques previously described may be also be utilized in this design. An added advantage of the modified design of phasar 100 is that the reflection control may be preformed continuously as a function of wavelength. Another advantage of the design is that the output is directed to a waveguide different from the input waveguide. Consequently, no circulator is required.

In this design, the angle of the reflective output surface must be precisely controlled so that the reflected light focuses into the desired output waveguide. One method for compensating for slight imperfections in focusing is to utilize groups of output waveguides, each having a slight offset from the next. This construction accommodates variations in reflection angles within a certain predetermined tolerance.

Figure 7:
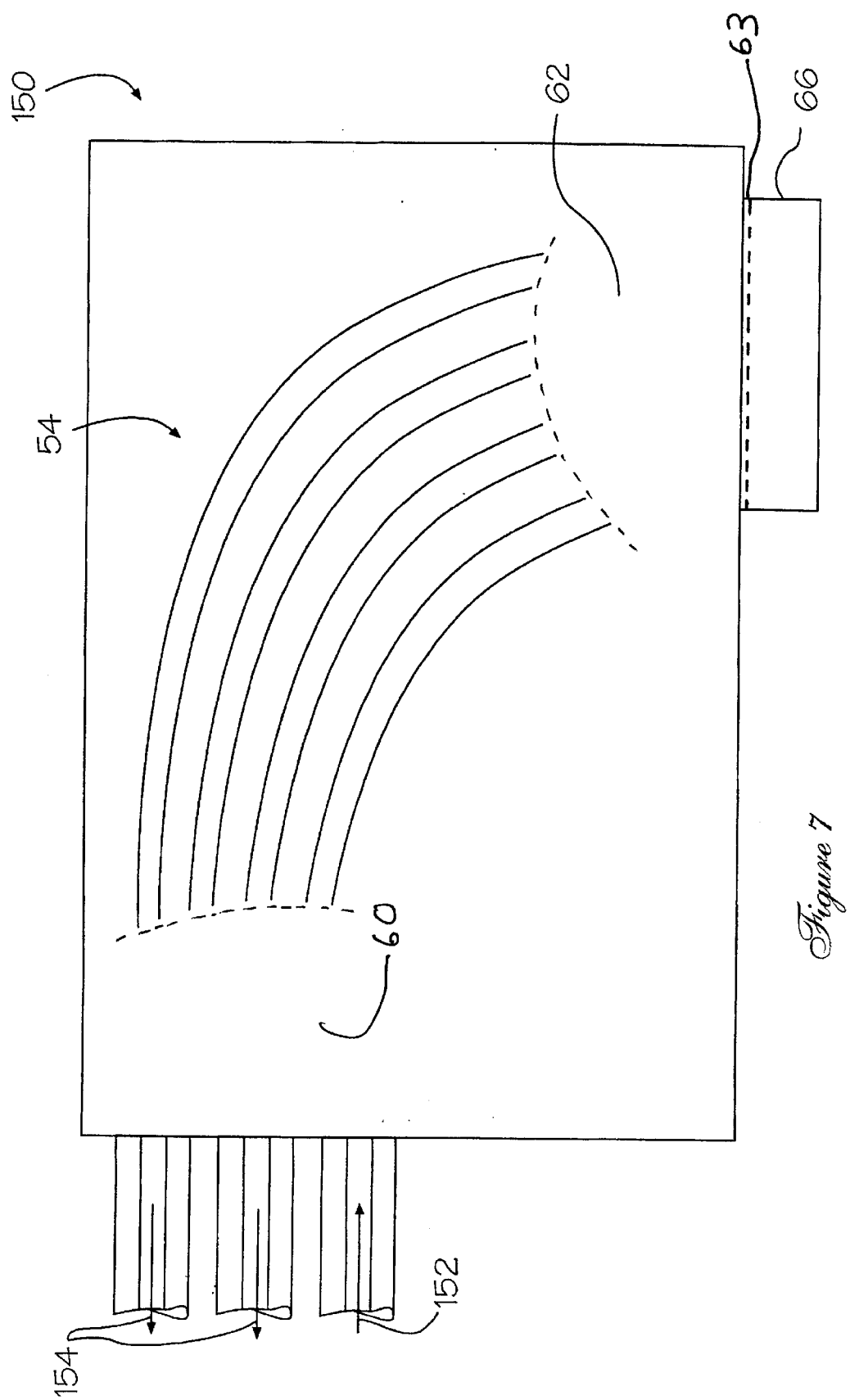
FIG. 7 is a schematic view of an alternate implementation of an optical phasar having a reflective array attached, in accordance with the present invention.

Another way to compensate for this issue is to eliminate all planar input/output waveguides, instead connecting the input and output fibers directly to the phasar chip by active alignment. Referring now to FIG. 7, there is shown a schematic view of such an arrangement. A phasar device 150 is shown having one or more input fibers 152 and one or more output fibers 154 attached directly to the input/output face of phasar 150. Light arriving on input fibers 152 is diffracted through a lens 60 (in FIG. 7 the lens has one flat surface, although it can have two curved surfaces as in FIG. 4) and then is dispersed directly into waveguide array 54. Light passing through waveguide array 54 enters a wavelength-dispersing lens 62 and is dispersed to a reflector assembly 66 attached end-on to phasar 150 in the same manner previously described. By actively aligning output fibers 154, effective coupling of the output wavelength channels or bands is achieved. This design compensates for variations in the angles in fabrication. Element 63 in FIG. 7 is an optional polarization element inserted between the reflector assembly and the phasar chip.

Another variation of the design would be to direct different wavelength sets (bands of wavelengths) to different output waveguides. To accomplish this, the end face of the phasar would require polishing at different angles to provide appropriate virtual reflected spots. Such capability would allow the use of a single optical device to both flatten different bands (e.g., conventional band, L-band, etc.) and then "route" the different bands to different paths for further amplification, etc. Such capability, when accomplished in a dynamic fashion, is useful for constructing devices such as reconfigurable switches with built-in gain flattening.

The designs presented heretofore have used static reflective devices in combination with a variety of different phasar designs to provide gain flattening or shaping. The design concepts may be extended to provide dynamic devices by providing a mechanism for controlling (i.e., moving, etc.) the reflective elements. For example, many of the techniques already described can be extended to dynamic gain flattening by mounting the reflector elements on an array of movable support "posts" or "beams" such as "MEMS" ('micro-electro-mechanical systems'). The movement of the support structures may take place in rectilinear (longitudinal or vertical) directions, or may be rotational relative to the phasar face.

Figure 8:
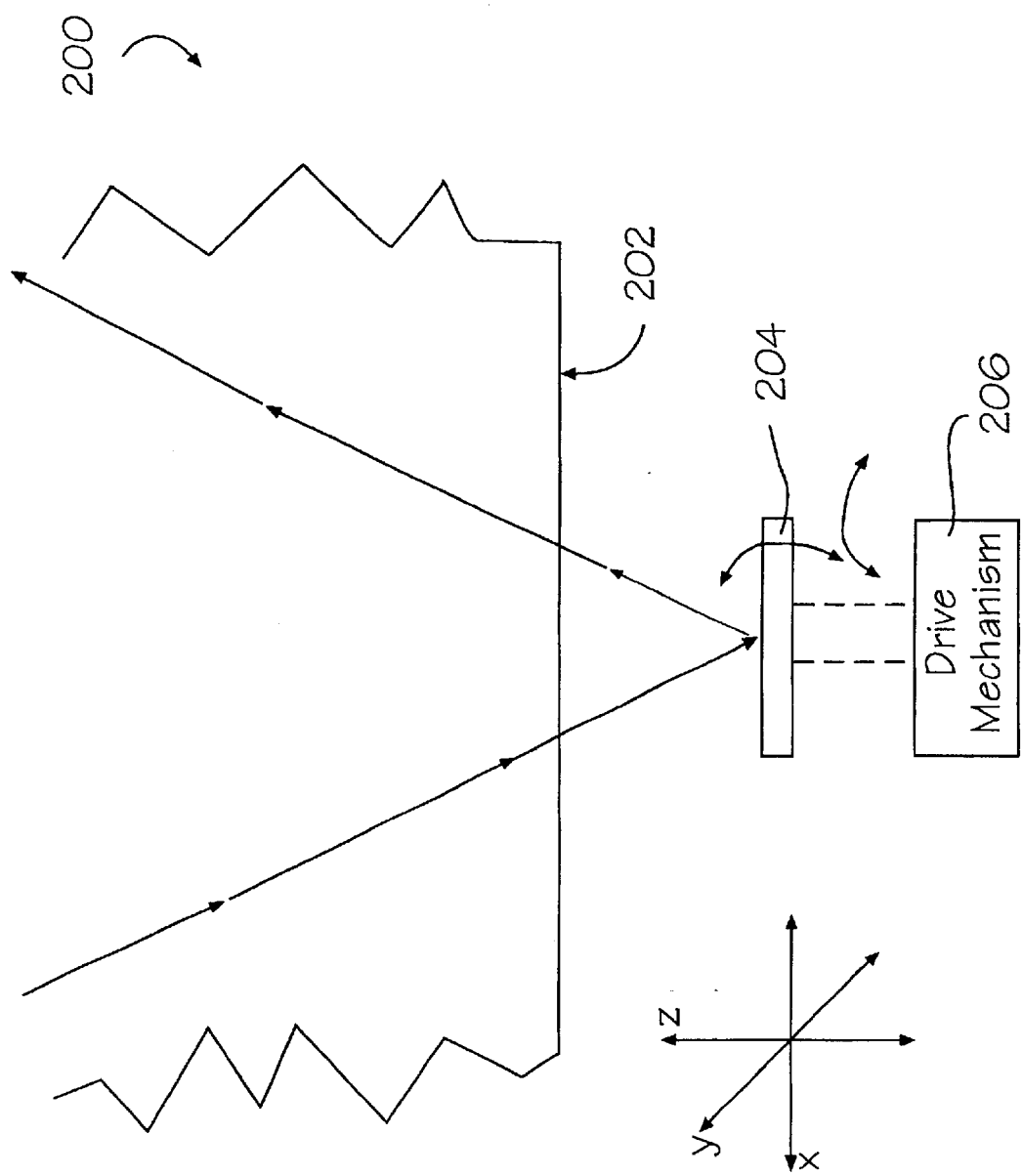
FIG. 8 is a schematic view of a dynamically-configurable reflective element for use in the wavelength-selective optical component of the present invention.

Referring now to FIG. 8, there is shown a schematic view of a design having movable reflective elements. A portion of an optical phasar device 200 having an output face 202 is shown. A reflective element 204, representative of an array of reflective elements, is attached to a drive mechanism 206. Drive mechanism 206 is adapted to move reflective element 204 along an X, Y, or Z-axis relative to face 202. In addition, drive mechanism 206 may impart rotary movement around the X-, Y- or Z-axis. Using any of these techniques, it is possible to change, dynamically, the amount of light reflected and coupled back into the phasar 200 and, ultimately, to an output fiber. While any mechanical, electrical, pneumatic, hydraulic or other well-known technology may be utilized to impart such motion, it appears that a relay switch array operating on miniature electromagnetic coils or miniature stepper motors or MEMS arrangement may be suitable choices. Since the size of these devices is generally large compared to the spacing of the individual arrays needed for the reflective elements, the movement of the motor can be "leveraged" to the closed spaced reflector array by mechanical levers or pneumatic/hydraulic techniques. In alternate embodiments, a more directly movable array, such as may incorporate miniature piezoelectric or bimetallic strips, may be utilized. Less conventional techniques such as shape memory Ti/Ni alloy beam arrays or shape memory wires built into arrays, electro-chromic arrays, electro-static deflection arrays and MEMS arrays may also be considered. Such devices may be activated by electrical signals, thereby allowing control/feedback types of activation systems. It should be possible to direct movement of the reflective elements with enough accuracy to control the attenuation with better than 0.1 dB resolution. Many of these control/activation mechanisms have response times in the low millisecond range, which allows real time control of attenuation.

A reconfigurable wavelength selective router having built-in gain flattening may be constructed using some of the techniques for static and dynamic gain flattening described hereinabove. One approach to implement such a device is to combine the reflector concept with rotation capability. With controlled rotation for one angular position, the corresponding wavelengths falling on that reflector element can be directed to one output waveguide/fiber. For another angular/virtual reflection position, the corresponding wavelength may be directed to a different output waveguide/fiber. Using such an approach, any random set of wavelengths can be directed to any output fiber.

With certain additional capabilities, the same device can be used for gain-flattening also. For example, if the angle of rotation can be finely controlled, the light of any given wavelength coupled back to the output waveguides/fibers is changed, as in the case of the dynamic gain flattening.

Because of the reflective geometry used here, light travels the same path, more or less, twice. By switching the TE and TM modes at the reflector element, any polarization effects can be compensated to a very large extent.

Much of the discussion hereinabove has been based on planar phasar devices. The concepts and techniques disclosed here, however, are more general and are applicable with other planar or hybrid or bulk optical wavelength-dispersive components. For example, with minor changes it is possible to utilize planar grating devices or hybrid grating devices. Similar changes would allow the substitution of a multi-path interference device.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. Having thus described the invention, what is desired to be protected by Letters Patent is presented in the subsequently appended claims.

What is claimed is:

1. An optical component for selectively attenuating a light signal, the light signal including a plurality of discrete wavelengths, the optical component comprising:

A frequency-dispersive element for separating the plurality of discrete wavelengths from one another;

an array of reflective elements optically connected to the frequency dispersive element for selectively attenuating at least one of the plurality of discrete wavelengths to produce substantially equal intensity of the light signal for all the plurality of discrete wavelengths; and a router for combining the plurality of discrete wavelengths into at least one output signal having a substantially equal gain across all of the plurality of discrete wavelengths; wherein the array of reflective elements is dynamically connected to the frequency-dispersive element for changing the wavelength response of the optical component.

2. The optical component of claim 1, wherein the frequency-dispersive element is an integrated optical phased array.

3. The optical component of claim 2 wherein each reflective element in the array of reflective elements has a predetermined surface area and a predetermined reflectivity.

4. The optical component of claim 3 wherein the predetermined surface areas are substantially equal and the predetermined reflectivity of the individual reflectors in the array of reflective elements varies.

5. The optical component of claim 3 wherein the predetermined surface area of at least one reflective element differs from the predetermined surface area of at least one other reflective element.

6. The optical component of claim 3 wherein the predetermined surface areas are reflective material defining patterns.

7. The optical component of claim 1 wherein the frequency-dispersive element has a plurality of output waveguides operatively connected thereto, and the array of reflective elements is operatively connected to each of the plurality of output waveguides by a direct, end-on attachment.

8. The optical component of claim 1 wherein the frequency-dispersive element has a plurality of output waveguides operatively connected thereto, and the array of reflective elements is operatively connected to each of the plurality of output waveguides by a top attachment using an angled bevel.

9. The optical component of claim 1 wherein the frequency-dispersive element has a plurality of output waveguides operatively connected thereto, and the array of reflective elements is operatively connected to each of the plurality of output waveguides by a remote attachment using a pigtail.

10. The optical component according to claim 1, wherein the frequency dispersive element has a slanted face at the end opposite the signal input end of the component, and the reflective array is attached to said slanted face or positioned at a selected distance from said slanted face to thereby reflect input signals at a point other than their focal point, and thereby create a virtual image using said reflected signals, and further transmitting rays creating the virtual image back through the optical component to a waveguide and optical fiber different than those used to input the original signal.

11. The optical component according to claim 10, wherein the reflector assembly is a micro-electro-mechanical system.

12. The optical component according to 1, wherein a polarizing element is positioned between the frequency dispersive element and the reflective assembly.

13. The optical component according to claim 1, wherein the reflectors of said reflective assembly are not movable, and when said optical component acts as a gain flattening device it is acting as a static gain flattening device.

14. An optical component for selectively attenuating a light signal, the light signal including a plurality of discrete wavelengths, the optical component comprising:
a frequency-dispersive element for separating the plurality of discrete wavelengths from one another;
an array of reflective elements optically connected to the frequency dispersive element for selectively attenuating at least one of the plurality of discrete wavelengths to produce substantially equal intensity of the light signal for all the plurality of discrete wavelengths; and
a router for combining the plurality of discrete wavelengths into at least one output signal having a substantially equal gain across all of the plurality of discrete wavelengths:
wherein the frequency-dispersive element has a plurality of output waveguides operatively connected thereto, and
wherein each reflective element in the array of reflective elements is movable relative to a corresponding one of the plurality of output waveguides, the array of reflective elements thus being dynamically positionable to attenuate the light intensity traversing through the plurality of output waveguides and being reflected by the array of reflective elements.

15. The optical component according to claim 14, wherein the reflector assembly is a micro-electro-mechanical system.

16. An optical component for selectively routing a plurality of discrete wavelength channels in a multiplexed light signal, the optical component comprising:
a frequency-dispersive element for separating the plurality of discrete wavelengths channels from one another;
an array of reflective elements optically connected to the frequency-dispersive element for selectively and independently reflecting selected ones of the plurality of discrete wavelengths channels in response to a control; and
a multiplexer for combining the selected ones of the plurality of discrete wavelengths channels into at least one output signal
wherein a plurality of remaining ones of the plurality of discrete wavelength channels not reflected by the array of reflective elements are transmitted past the array of reflective elements, the optical component further comprising a second multiplexer for combining the remaining ones of the plurality of discrete wavelength channels into at least one second output signal.

17. A hybrid optical component for selectively routing and/or changing the characteristics of a plurality of discrete wavelengths in a multiplexed light signal, the optical component comprising:
an optical component selected from the group consisting of phasar devices, planar grating devices, and bulk optical wavelength-dispersive devices;
a frequent-dispersive element for separating the plurality of discrete wavelength channels from one another;
an assembly of reflective elements optically connected to the frequency-dispersive element for selectively and independently reflecting selected ones of the plurality of discrete wavelength channels in response to a control; and
a multiplexer for combining the selected one of the plurality of discrete wavelength channels into at least one output signal
wherein the reflector assembly is a micro-electro-mechanical system.

18. The hybrid optical component according to claim 17, wherein said component includes a polarizing element positioned between the reflective assembly or one or a plurality of the reflective elements thereof, and any element positioned before the reflective or reflective elements thereof which transmit a wavelength to the reflective assembly or a reflective element thereof.

19. The optical component according to claim 18 wherein the reflector assembly is a micro-electro-mechanical system.

* * * * *